US012749884B2

(12) United States Patent
Jain et al.

(10) Patent No.: US 12,749,884 B2
(45) Date of Patent: Sep. 29, 2026

(54) DYNAMIC ADAPTIVE OVERCURRENT PROTECTION

(71) Applicant: Alliance for Sustainable Energy, LLC, Golden, CO (US)

(72) Inventors: Rishabh Jain, Denver, CO (US); Jay Ramesh Sawant, Golden, CO (US)

(73) Assignee: Alliance for Energy Innovation, LLC, Golden, CO (US)

(*) Notice: Subject to any disclaimer, the term of this patent is extended or adjusted under 35 U.S.C. 154(b) by 402 days.

(21) Appl. No.: 18/583,644

(22) Filed: Feb. 21, 2024

(65) Prior Publication Data

US 2025/0038512 A1 Jan. 30, 2025

Related U.S. Application Data

(60) Provisional application No. 63/525,392, filed on Jul. 7, 2023, provisional application No. 63/486,147, filed on Feb. 21, 2023.

(51) Int. Cl.

*H02H 3/08* (2006.01)
*H02H 1/00* (2006.01)
*H02H 3/00* (2006.01)
*H02H 9/02* (2006.01)

(52) U.S. Cl.

CPC .......... *H02H 3/006* (2013.01); *H02H 1/0007* (2013.01); *H02H 3/08* (2013.01)

(58) Field of Classification Search

CPC ........ H02H 3/006; H02H 3/08; H02H 1/0007; H01H 47/002

USPC ........................................................ 361/93.1

See application file for complete search history.

(56) References Cited

U.S. PATENT DOCUMENTS

2016/0190790 A1* 6/2016 Oudalov .................. H02H 7/28 361/66
2016/0301199 A1* 10/2016 Mori ...................... H02H 3/021

OTHER PUBLICATIONS

Jain et al., "Dynamic Adaptive Protection for DistributionSystems in Grid-Connected and Islanded Modes", IEEE Transactions on Power Delivery, Feb. 2019, vol. 34, No. 1, pp. 281-289.

Jain et al., "Dynamic Adaptive Relaying for Distribution Grids with High Inverter-based Generation", 2023 IEEE Industry Applications Society Annual Meeting (IAS), pp. 1-8.

* cited by examiner

*Primary Examiner* — Crystal L Hammond
(74) *Attorney, Agent, or Firm* — Robert G. Pittelkow

(57) ABSTRACT

Techniques of the present disclosure provide dynamic adaptive overcurrent protection. An example device includes at least one processor configured to determine, based on one or more steady state system parameters that define a state of a power distribution system, a local voltage value at a protective device, and a local current value at the protective device, an estimated minimum fault current for the protective device. The at least one processor may be further configured to determine, based on the estimated minimum fault current and a rated load current for the protective device, an adaptive pickup setting for the protective device. The at least one processor may also be further configured to cause the protective device to trip a circuit breaker in response to determining that an updated value of the current at the protective device exceeds the adaptive pickup setting.

20 Claims, 3 Drawing Sheets

DYNAMIC ADAPTIVE OVERCURRENT PROTECTION

CROSS-REFERENCE TO RELATED APPLICATIONS

This application claims the benefit of U.S. Provisional Application No. 63/486,147, filed Feb. 21, 2023, and U.S. Provisional Application No. 63/525,392, filed Jul. 7, 2023, the entire content of each of which is incorporated herein by reference.

GOVERNMENT LICENSE RIGHTS

This invention was made with government support under Contract No. DE-AC36-08GO28308 awarded by the Department of Energy. The government has certain rights in the invention.

BACKGROUND

The penetration of inverter-based distributed energy resources (IBDERs) at medium and low voltage nodes in power distribution systems is increasing rapidly. Consequently, both the operating load and the fault current seen by a protective device (PD) within the distribution system may vary significantly over time. This rapid integration of DERs is a pivotal step towards a sustainable and resilient energy infrastructure. Such a transition introduces complexities in grid management, particularly in fault detection and isolation, leading to potential reliability and safety concerns.

SUMMARY

In one example, a device includes at least one processor configured to determine, based on one or more steady state system parameters that define a state of a power distribution system, a value of a voltage at a protective device in the power distribution system, and a value of a current at the protective device, an estimated minimum fault current for the protective device. The at least one processor may be further configured to determine, based on the estimated minimum fault current and a rated load current for the protective device, an adaptive pickup setting for the protective device. Responsive to determining that an updated value of the current at the protective device exceeds the adaptive pickup setting, the at least one processor may be further configured to cause the protective device to trip a circuit breaker.

In another example, a method includes determining, by a computing device comprising at least one processor, based on one or more steady state system parameters that define a state of a power distribution system, a value of a voltage at a protective device in the power distribution system, and a value of a current at the protective device, an estimated minimum fault current for the protective device. The method may also include determining, by the computing device, based on the estimated minimum fault current and a rated load current for the protective device, an adaptive pickup setting for the protective device. The method may also include, responsive to determining that an updated value of the current at the protective device exceeds the adaptive pickup setting, causing, by the computing device, the protective device to trip a circuit breaker.

In another example, a computer readable storage medium is encoded with instructions that, when executed, cause at least one processor of a computing device to determine, based on one or more steady state system parameters that define a state of a power distribution system, a value of a voltage at a protective device in the power distribution system, and a value of a current at the protective device, an estimated minimum fault current for the protective device. The computer readable storage medium may be further encoded with instructions that, when executed, cause the at least one processor to determine, based on the estimated minimum fault current and a rated load current for the protective device, an adaptive pickup setting for the protective device. The computer readable storage medium may be further encoded with instructions that, when executed, cause the at least one processor, responsive to determining that an updated value of the current at the protective device exceeds the adaptive pickup setting, to cause the protective device to trip a circuit breaker.

The details of one or more examples are set forth in the accompanying drawings and the description below. Other features, objects, and advantages will be apparent from the description and drawings, and from the claims.

DETAILED DESCRIPTION

Figure 1:
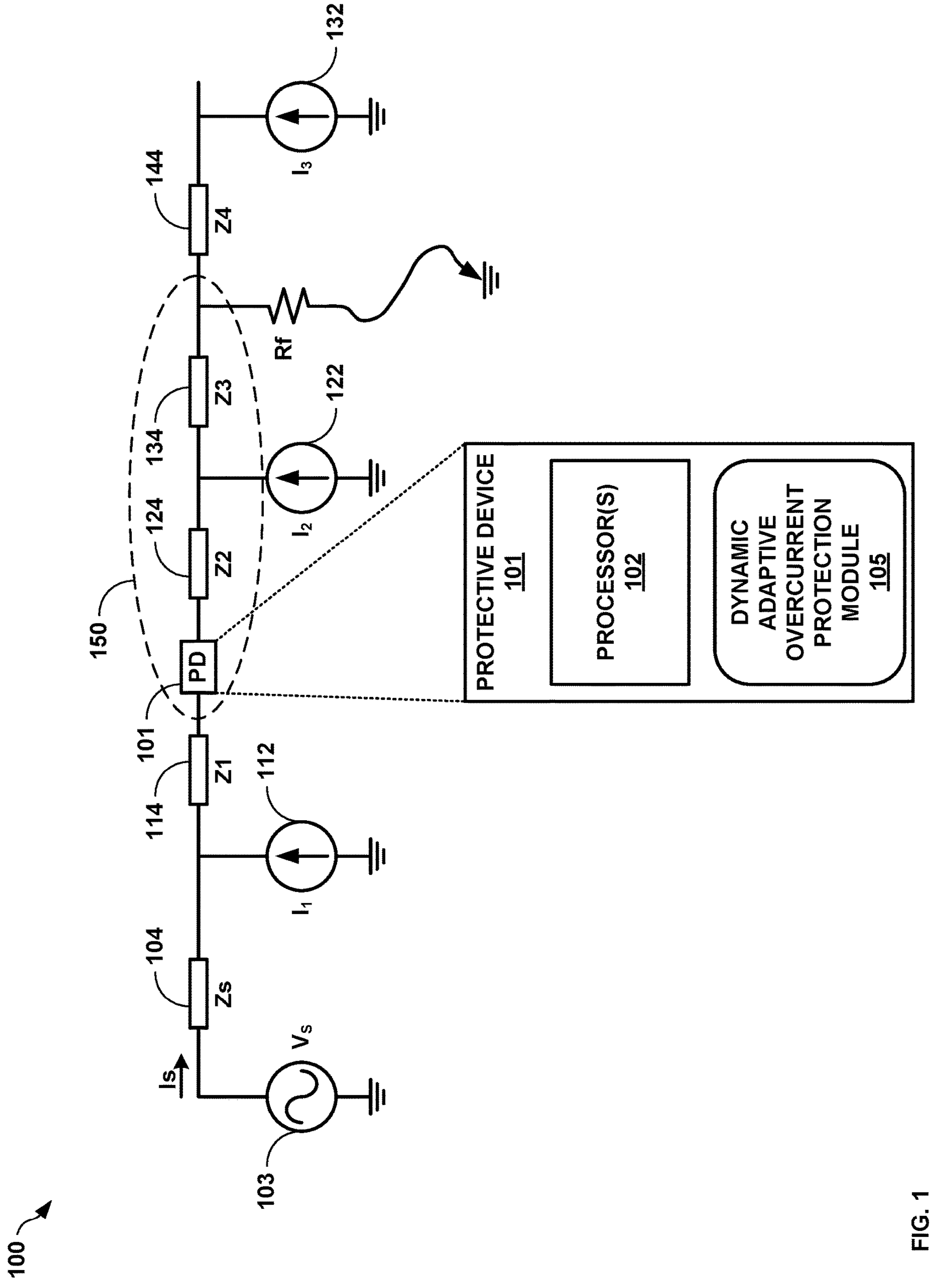
FIG. 1 is a conceptual diagram illustrating a representation of an example power distribution system including a protective device configured to perform dynamic adaptive overcurrent protection, in accordance with one or more aspects of the present disclosure.

The present disclosure provides techniques for estimating fault current using system measurements, which may be particularly useful in distribution systems with multiple sources of distributed generation. The techniques of the present disclosure may allow a protective relay to dynamically estimate the expected minimum local fault current based on local measurements of voltage and current. This estimate compensates for the loss of sensitivity due to fault current from local generation, which is often invisible to the given relay. In accordance with some of the techniques described herein, this estimate may then be used to dynamically adjust the relay's sensitivity or, in other words, determine a dynamically adaptive overcurrent pickup for the relay. The pickup almost instantaneously (e.g., <100 ms) adjusts to the change in system operating conditions and adapts the relay's sensitivity to the system. This results in a faster and more reliable (compared to related-art adaptive methods) trip and increased reliability of the system protection.

Reliable fault detection and isolation is quintessential for modern distribution systems to operate reliably. These systems are integrated with inverter-based distributed energy resources (IBDERs) and advanced distribution management system (ADMS) functions. A change in system operating conditions and/or topology can, therefore, influence the fault current seen by a protective device (PD)—sometimes leading to mis-operation. Adaptive overcurrent relaying (AOCR)

may address these concerns by enabling a PD to adjust its pickup settings based on the system operating conditions. However, applicability and reliability of AOCR can be limited by its dependence on computationally complex routines—which may require an external controller—and the need to repeatedly reprogram the PD to tune its sensitivity and selectivity.

The dynamic adaptive overcurrent protection (DOCP) techniques provided herein address the limitations of traditional AOCR. DOCP allows the PD to locally estimate the fault current based on its measurements-thereby eliminating the need for reprogramming the relays and dependence on computationally complex routines. This also significantly reduces the dependence of PD on communication for adapting its decisions, leading to more reliable operation during contingencies.

The techniques of the present disclosure are fundamentally different in how the settings necessary to detect a fault are determined. Related-art solutions either (a) depend on precomputed values based on an in-depth analysis of the system, or (b) utilize a centralized agent-based scheme which communicates with the relays in real-time and then computes the settings for them using optimization solvers. In contrast, the techniques described herein avoid using conservative values, which are based on the assumed system state based on historical data and expected system usage. This may allow for improved accuracy, as these conservative, or state of the art estimates may not reflect the actual state of the system at the time of a fault and will not be able to adapt to the real-time changes in system state. The techniques described herein also avoid heavy reliance on communication and on an intensive communication and metering infrastructure, which is not always available at the time of disturbances and natural disasters. This may allow systems and devices using the techniques described herein to operate reliably when needed the most. The techniques of the present disclosure also avoid the fundamental flaw of continuously reprogramming the relay using external variables to adapt to the system state.

The techniques of the present disclosure may provide local, worst-case fault current estimation for a system with high levels of local generation without the need to actively communicate with the DERs. Such communication is often not possible and, as it would be extremely slow (>100 ms), it would likely be irrelevant, regardless. The techniques described herein may also enable a relay to adapt its sensitivity without relying on external entities through communication. This, in turn, fosters more flexibility and reliability and addresses some of the most critical challenges faced by related-art approaches for adaptive protection.

In accordance with the techniques of the present disclosure, the lowest fault current estimation can be used for planning reconfiguration as a part of the provided protectability index. The resulting reconfiguration operations may thus serve as a commercial approach that considers the protectability of a topology before service restoration or system reconfiguration.

Furthermore, the techniques described herein are compatible with existing, commercial relays and other protective devices, without the need for specialized hardware or sensing capabilities. This may greatly reduce the market barriers to commercialization since the ability can be provided to existing devices with a software update. Additionally, new device designs may develop customized protection elements around the techniques described herein.

FIG. 1 is a conceptual diagram illustrating a representation of an example power distribution system (system 100) including a protective device (protective device 101) configured to perform dynamic adaptive overcurrent protection, in accordance with one or more aspects of the present disclosure. In the example of FIG. 1, protective device 101 is configured to protect devices in protection zone 150. As shown in the example of FIG. 1, system 100 also includes voltage source 103 (labeled "Vs") and source impedance 104 (labeled "Zs"). Voltage source 103 and source impedance 104 are an equivalent circuit representing the power distribution system upstream of protective device 101. System 100 also includes current sources 112, 122, and 132 (labeled "$I_1$", "$I_2$", and "$I_3$", respectively) and impedances 114, 124, 134, and 144 (labeled "Z1", "Z2", "Z3", and "Z4", respectively). Components 112 and 114 are an equivalent circuit representing an aggregate of the DERs that are upstream of protective device 101. Components 122, 124, and 134 are an equivalent circuit representing an aggregate of the DERs that are downstream of protective device 101 and that are within protection zone 150. Components 132 and 144 are an equivalent circuit representing an aggregate of the DERs that are downstream of protective device 101 and that are not within protection zone 150. As shown in the example of FIG. 1, a fault exists between impedances 134 and 144. The fault has an impedance of Rf. In the example of FIG. 1, system 100 may represent only a portion of a larger power distribution system. In other words, a representation of only a portion of the power distribution system is shown, for brevity, but the larger power distribution system may include other sources, loads, protective devices, and/or other components. As explained, system 100 is only a representation of an example power distribution system, as many of the components within system 100 are an equivalent circuit, as opposed to the actual components existing in the power distribution system.

In the example of FIG. 1, protective device 101 may represent a relay and a computing device. As shown in the example of FIG. 1, protective device 101 includes processor(s) 102 and dynamic adaptive overcurrent protection module 105. Processor(s) 102 may represent hardware capable of operating protective device 101 in accordance with the techniques described herein. Dynamic adaptive overcurrent protection module 105 may represent software or firmware executable by processor(s) 102 to cause protective device 101 to perform one or more of the techniques described herein.

In accordance with the techniques described herein, protective device 101 may be configured to determine an estimated minimum fault current for protective device 101. In the example of FIG. 1, protective device 101 may determine the estimated minimum fault current based on one or more steady state system parameters that define a state of system 100, as well as on values of a voltage and current at the protective device 101. The estimated minimum fault current may be determined as further described below and represents an estimate of the lowest current that protective device 101 might see during a fault, taking into account the operation of various DERs in system 100.

In accordance with the techniques described herein, protective device 101 may be configured to determine an adaptive pickup setting for protective device 101. In the example of FIG. 1, protective device 101 may determine the adaptive pickup setting based on the estimated minimum fault current and a rated load current for protective device 101.

In accordance with the techniques described herein, responsive to determining that an updated value of the current at protective device 101 exceeds the adaptive pickup setting, protective device 101 may causing protective device 101 to trip a circuit breaker. In the example of FIG. 1, for instance, protective device 101 may operate an electronic switch, a magnetic switch, or other mechanism to disconnect an upstream portion of the power distribution network from a downstream portion of the power distribution network.

Protective device 101 represents only one example of a device configured to perform the techniques described herein and, in other examples, various other devices or systems may be configured to perform the techniques of the present disclosure. For instance, in the example of FIG. 1, protective device 101 is depicted as a single device, representing both a physical relay and a computing device configured to perform dynamic adaptive overcurrent protection as detailed herein. In other examples, the computing device and the relay device may be separate but communicatively connected. For example, the computing device configured to perform dynamic adaptive overcurrent protection may be a standalone module that may be attached and/or communicatively coupled with an existing relay. As another example, the computing device may be a control board that can be installed in the relay. In other words, in various examples, the techniques of the present disclosure may be implemented in various combinations of devices consisting of hardware, software, firmware, and/or various combinations thereof.

Figure 2:
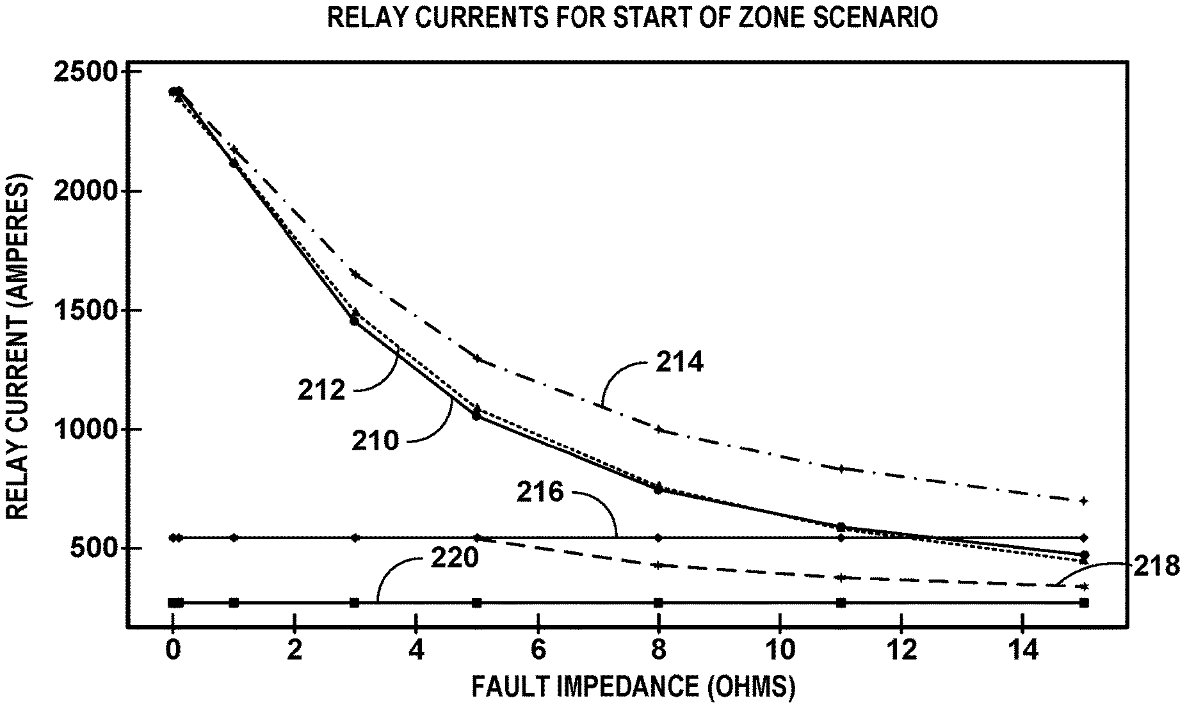
FIG. 2 is a graphical plot illustrating an example comparison between the estimated minimum fault current through a relay generated using dynamic adaptive overcurrent protection as described in the present disclosure versus the actual fault current.

FIG. 2 is a graphical plot illustrating an example comparison, using a designated protection zone and relay within the EPRI J1 feeder with 3-phase PV systems, between the estimated minimum fault current through a relay (line 210) generated using dynamic adaptive overcurrent protection as described in the present disclosure versus the actual fault current (212). In the example of FIG. 2, line 210 is depicted using a solid line and circles as datapoints. Line 212 represents the actual fault current through the relay at 80% photovoltaic (PV) penetration (simulated using the OpenDSS distribution system simulator software) and is depicted using a short-dashed line and triangles as datapoints. Line 214 represents the actual fault current through the relay at 0% PV penetration (simulated using OpenDSS) and is depicted using a line having alternating dashes and dots and four-point stars as datapoints. Line 216 represents the base pickup value of the relay and is depicted using a solid line and diamonds as datapoints. Line 218 represents the dynamic pickup value calculated by the relay using the techniques described herein and is depicted using a long-dashed line and six-point stars as datapoints. Line 220 represents the maximum load current for the relay and is depicted using a solid line and squares as datapoints.

As can be seen in the example of FIG. 2, the estimated minimum fault current (line 210) is close to the actual values from simulation (line 212), and the dynamic pickup value calculated by the relay (line 218) adapts to ensure the relay will correctly trip a circuit breaker during a fault, even when the potential fault current is significantly reduced.

To detect faults reliably using local information only, a PD needs to be able to anticipate the worst-case fault currents with reasonable accuracy. The techniques provided herein may enable PDs to locally estimate the pickup settings and dynamically modify them in real-time without the need for change in protection group settings or external reprogramming. These techniques will allow the relay to detect faults in both grid-connected and islanded mode of operation.

The techniques of dynamic adaptive overcurrent protection disclosed herein may be performed by a device, such as a computing device, comprising at least one processor. In some examples, the computing device may be a relay or other PD itself, capable of performing DOCP on its own. That is, relays or other PDs may perform the techniques described herein on their own. In some examples, the computing device may be a separate device, performing DOCP for a single relay or PD, or for multiple relays or PDs.

Figure 3:
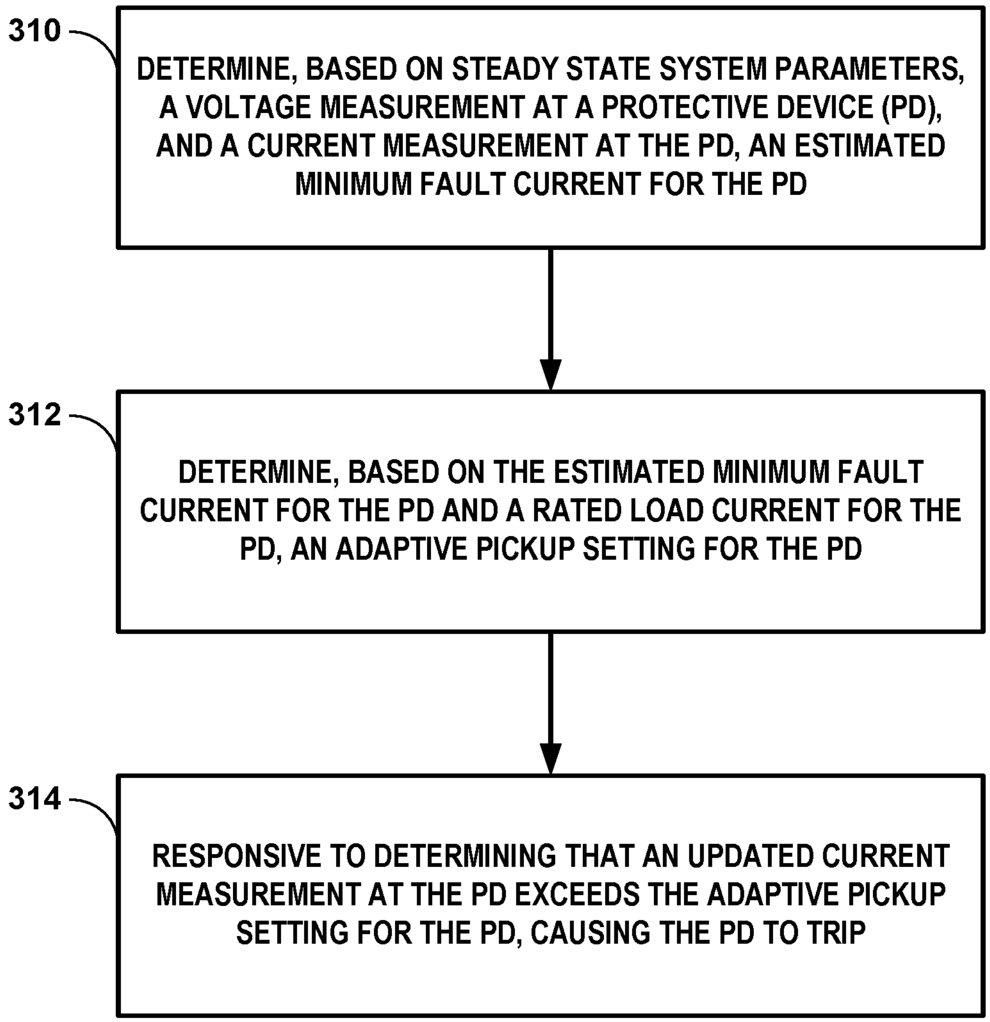
FIG. 3 is a flow diagram illustrating example operations for performing dynamic adaptive overcurrent protection, in accordance with one or more aspects of the present disclosure.

FIG. 3 is a flow diagram illustrating example operations for performing dynamic adaptive overcurrent protection, in accordance with one or more aspects of the present disclosure. The example operations of FIG. 3 represent only one process for performing dynamic adaptive overcurrent protection as described herein, and various other or additional operations may be used in other examples. The example operations of FIG. 3 are described below within the context of FIG. 1. The example operations of FIG. 3 are within the context of a three-phase system and thus the operations may be performed on a per-phase basis. In other examples, the techniques of the present disclosure may be utilized in a single-phase system or other system and may not be performed on a per-phase basis.

In accordance with the techniques of the present disclosure, an example computing device may receive or obtain a local voltage measurement ($V_{PD\text{-}PV}$) and a local current measurement ($I_{PD\text{-}PV}$) for each active phase (A, B, C) at a PD. For example, protective device 101 may measure voltage and current at protective device 101 for each active phase of protective device 101. Non-existent or inactive phases need not be measured. For instance, if a line only has Phase A and B, the example computing device may need only the local current and voltage measurements in Phase A and B. Calculations for a given phase do not need measurements from any other phase.

In accordance with the techniques of the present disclosure, the example computing device may also receive, obtain, or otherwise be configured with certain steady-state system parameters, also called state indices. For instance, protective device 101 may be configured with state indices for system 100. In some examples, these steady-state system parameters may be configured in the example computing device by a system operator. The parameters may include: a line impedance in a protection zone covered by the PD ($Z_L$); a rated current capacity of the downstream aggregated equivalent generation within the protection zone ($I_{2\text{-}rated}$); a rated current capacity of the downstream aggregated equivalent generation outside of the protection zone ($I_{3\text{-}rated}$); an aggregation factor (r), which represents a ratio of the equivalent impedance of the aggregated equivalent generation within the protection zone ($Z_2$) to the line impedance in the protection zone ($Z_L$); a minimum terminal voltage of the downstream aggregated equivalent generation within the protection zone ($V_{2\text{-}min}$); a minimum terminal voltage of the downstream aggregated equivalent generation outside of the protection zone ($V_{3\text{-}min}$); a base voltage of the protective device ($V_{base\text{-}ph}$); and a rated load current as seen by the protective device ($I_{load\text{-}max\text{-}PD}$). In the example of FIG. 3, each of these parameters may be per-phase.

With reference to the example of FIG. 1, these per-phase parameters may be: the line impedance in protection zone 150 (I.e., Z2+Z3); a rated current capacity of current source 122, which represents downstream aggregated equivalent DER generation within protection zone 150; a rated current capacity of current source 132, which represents downstream aggregated equivalent DER generation outside of protection zone 150; an aggregation factor representing a ratio of impedance 124 to the line impedance of protection zone 150; a minimum terminal voltage for current source 122; a minimum terminal voltage for current source 132; a base voltage of protective device 101; and a rated load current as seen by protective device 101.

In some examples, these steady-state system parameters may be updated when a significant change in the system state occurs. In some such examples, a significant change in the system state may be include a change in system topology, a change in available DER penetration by more than 50%, a significant change in downstream system load, and/or other changes having a substantial effect on the system or the value of state indices.

In the example of FIG. 3, the example computing device may determine an estimated minimum fault current for a PD ($I_{fault\text{-}PD}$) (operation 310). For instance, protective device 101 may determine $I_{fault\text{-}PD}$ through performing the following operations:

i. Determine a per-phase impedance bias factor $Bias_{impedance}$ as follows:

$$\mathrm{Bias}_{impedance} = e^{-Z_L} \tag{1}$$

ii. Determine a per-phase current bias factor $Bias_{current}$ as follows:

$$Bias_{current} = \left(\frac{I_{2-rated} + I_{3-rated}}{I_{PD-PV}}\right) \tag{2}$$

iii. Determine a per-phase adjusted zonal impedance $$Z_l^*$$

as follows:

$$Z_L^* = Z_L * Bias_{current} * Bias_{impedance} \tag{3}$$

iv. Determine a per-phase fault impedance compensation factor, $R_{f\_estimate}$ as follows:

$$R_{f\_estimate} = \left(\frac{V_{PD-PV}}{I_{PD-PV}}\right) - Z_L^* \tag{4}$$

v. Determine a per-phase downstream load-compensation factor, $I_{load\text{-}fictitious}$ as follows:

$$I_{load-fictitious} = \frac{V_{PD-PV}}{V_{base-ph}} * I_{load-max-PD} \tag{5}$$

vi. Estimate the per-phase terminal voltage ($V_2$) at the equivalent electrical distance $$(r * Z_L^*)$$

of DER having aggregate current $I_{2\text{-}rated}$ as follows:

$$V_2 = V_{PD\_PV} - I_{PD\_PV} * (r * Z_L^*) \tag{6}$$

vii. Estimate the per-phase terminal voltage ($V_3$) at the equivalent electrical distance $$(r * Z_L^*)$$

of DER having aggregate current $I_{3\text{-}rated}$ as follows:

$$V_3 = V_{PD\_PV} - (I_{PD\_PV} * Z_L^*) \tag{7}$$

viii. Determine per-phase adjusted downstream DER current contributions for $I_{DER} \in \{I_2, I_3\}$, $V_{DER} \in \{V_2, V_3\}$ as follows:

$$\text{IF } V_{DER} \le V_{DER-min} \text{ THEN } I_{DER} = I_{DER-rated} \tag{8a}$$

$$\text{IF } V_{DER} > V_{DER-min} \text{ THEN } I_{DER} = \frac{I_{DER-rated} * V_{DER-rated}}{V_{DER}} \tag{8b}$$

ix. Determine the per-phase estimated minimum fault current estimate ($I_{fault\text{-}PD}$) for the PD as follows:

$$I_{Fault-PD} = \left(\frac{V_{PD\_PV}}{Z_L^* + R_{f\_estimate}}\right) - I_{2-rated}\left(\frac{(1-r)Z_L^* + R_{f\_estimate}}{Z_L^* + R_{f\_estimate}}\right) - I_{3-rated}\left(\frac{R_{f\_estimate}}{Z_L^* + R_{f\_estimate}}\right) + I_{load-fictitious} \tag{9}$$

In the example of FIG. 3, the example computing device may determine a per-phase adaptive pickup setting for the PD (operation 312). For instance, protective device 101 may determine the per-phase adaptive pickup setting for protective device 101 through performing the following operation:

x. Determine a per-phase adaptive pickup setting ($I_{pickup\text{-}dynamic\text{-}phase}$) for the PD as follows:

$$I_{pickup-dynamic-phase} = a * I_{Fault-PD} + b * I_{load-max-PD} \tag{10}$$

$$\text{Subject to: } a, b \in [-2, 2] \text{ and}$$

$$I_{FAULT-PD} > I_{pickup-dynamic-phase} > I_{load-max-PD} \tag{11}$$

In operation x, the variables a and b may represent values chosen by a distribution system manager based on design principles—how conservative the utility is for the protection operation. The given formulation assumes (this is always true for normal operation, given the faults where an overcurrent relay should trip) that the load current is less than the estimated minimum fault current. In other words, the load current (normal operation) will be registered at a higher current if there is a fault. Various operators may have different parameters to determine how high this load current must be to classify an event as a fault.

In the example of FIG. 3, responsive to determining that an updated local current measurement $$\left(I_{PD-PV}^{t+1}\right)$$

at the relevant phase of the PD exceeds the adaptive pickup setting for the respective phase of the PD, the example computing device may cause the PD to trip a circuit breaker. For instance, protective device 101 may continue to update its local per-phase current(s) and compare such measurement(s) to the per-phase adaptive pickup setting. If the updated local current measurement exceeds the adaptive pickup setting, protective device 101 may trip a circuit breaker.

In some examples, one or more of these operations may be performed iteratively. That is, the example computing device may periodically (e.g., every 10 ms, 50 ms, 100 ms, every 1 s, or at any other interval) receive or obtain voltage and current measurements and determine a local fault current estimate and/or adaptive pickup setting through operations i-x. Furthermore, while all shown as separate operations, some of operations i-x may be combined. In other words, some of the separate equations are shown for clarity, but may be combined when the techniques disclosed herein are implemented in a computing device.

In some examples, not all of the operations shown in the example of FIG. 3 may be performed. For instance, in accordance with the techniques of the present disclosure, the minimum fault current estimate ($I_{FAULT-PD}$) may be used in various ways for diagnostic purposes and/or "real-time" (i.e., approximately immediate) protection. As one concrete example, the example computing device may, itself, be an overcurrent relay. The overcurrent relay may be configured with the steady-state system parameters detailed above and may periodically measure line voltage and current on each phase. The overcurrent relay may also periodically perform operations i-ix to effectively estimate the worst-case current for the given system when a fault occurs, perform operation x to determine an adaptive pickup setting, and adjust its sensitivity to isolate the fault more reliably. When a different fault disturbance occurs (e.g., different impedance, location, etc.), the overcurrent relay will, by iteratively performing the techniques described herein, again be able to adapt to the fault without having to be reconfigured by a system operator. As another example, the example computing device may be separate from but associated with a relay, and the example computing device may output the local fault current and/or the adaptive pickup setting for use by the relay. As yet another example, the example computing device may perform these techniques for multiple relays or protective devices and output the local fault current and/or the adaptive pickup setting for each.

In some examples, the techniques of the present disclosure may be used to determine the worst-case fault current for each protection zone in a system, subject to the worst-case fault conditions as defined by a user. The resulting estimates can be compared with the load conditions under normal load to determine if the given system can be protected reliably using overcurrent relays during a fault.

As an example of operation, consider the situation where an electric power utility needs to respond to a natural disaster and provide power to its customers despite points of failure in the normal system (e.g., a hurricane in Florida). The utility will need to depend on local generation (which may be more difficult to protect). The utility also needs to consider the possibility of additional failures and ensure that the reconfigured system will be able to protect itself from new faults. In such situation, the utility may employ the techniques disclosed herein to rapidly estimate the worst-case fault current without compromising on the power it can draw from any local generation. The relays and other protection devices will only need to be configured with appropriate steady-state system parameters (state-indices) for the reconfigured topology. The resulting system will be able to adapt automatically to protect the system during future faults, thereby helping the utility to reliably operate its system. This will, in turn, allow the utility to continue serving its customers with electricity—which is critical for emergency and sustenance needs—using a system which would otherwise take days to restore.

The techniques of the present disclosure may be additionally or alternatively described by one or more of the following examples:

Example 1: A device comprising at least one processor configured to: determine, based on one or more steady state system parameters that define a state of a power distribution system, a value of a voltage at a protective device in the power distribution system, and a value of a current at the protective device, an estimated minimum fault current for the protective device; determine, based on the estimated minimum fault current and a rated load current for the protective device, an adaptive pickup setting for the protective device; and responsive to determining that an updated value of the current at the protective device exceeds the adaptive pickup setting, cause the protective device to trip a circuit breaker.

Example 2: the device of example 1, wherein the one or more steady state system parameters comprise at least one of: a line impedance in a protection zone covered by the protective device; a rated current capacity of downstream aggregated equivalent generation within the protection zone; a rated current capacity of downstream aggregated equivalent generation outside of the protection zone; an aggregation factor representing a ratio of an equivalent impedance of the downstream aggregated equivalent generation within the protection zone to the line impedance in the protection zone; a minimum terminal voltage of downstream aggregated equivalent generation within the protection zone; a minimum terminal voltage of downstream aggregated equivalent generation outside of the protection zone; a base voltage for the protective device; or a rated load current for the protective device.

Example 3: The device of example 2, wherein determining the estimated minimum fault current for the protective device comprises calculating $$I_{Fault-PD} = \left(\frac{V_{PD-PV}}{Z_L^* + R_{f\_estimate}}\right) - I_{2-rated}\left(* \frac{(1-r)Z_L^* + R_{f\_estimate}}{Z_L^* + R_{f\_estimate}}\right) - I_{3-rated}\left(\frac{R_{f\_estimate}}{Z_L^* + R_{f\_estimate}}\right) + I_{load-fictitious},$$

wherein: $I_{Fault-PD}$ represents the estimated minimum fault current; $V_{PD-PV}$ represents the value of the voltage at the protective device;

$$Z_L^*$$

represents an adjusted zonal impedance determined based on the line impedance in the protection zone; $R_{f\_estimate}$ represents a fault impedance compensation factor determined based on the value of the voltage at the protective device, the value of the current at the protective device, and the adjusted zonal impedance; $I_{2\text{-}rated}$ represents the rated current capacity of downstream aggregated equivalent generation within the protection zone; r represents the aggregation factor; $I_{3\text{-}rated}$ represents the rated current capacity of downstream aggregated equivalent generation outside of the protection zone; and load-fictitious represents a downstream load compensation factor determined based on the value of the voltage at the protective device, the base voltage for the protective device, and the rated load current for the protective device.

Example 4: The device of any of examples 1-3, wherein determining the adaptive pickup setting for the protective device comprises calculating $I_{pickup\text{-}dynamic}=a*I_{Fault\text{-}PD}+b*I_{load\text{-}max\text{-}PD}$, subject to: a, b∈[−2,2]; and $I_{FAULT\text{-}PD}>I_{pickup\text{-}dynamic}>I_{load\text{-}max\text{-}PD}$, wherein: $I_{pickup\text{-}dynamic}$ represents the adaptive pickup setting for the protective device; $I_{Fault\text{-}PD}$ represents the estimated minimum fault current; a represents a first scaling factor usable to adjust an importance of the estimated minimum fault current; $I_{load\text{-}max\text{-}PD}$ represents a rated load current for the protective device; and b represents a second scaling factor usable to adjust an importance of the rated load current for the protective device.

Example 5: The device of any of examples 1-4, wherein: determining the estimated minimum fault current for the protective device comprises determining a plurality of estimated minimum fault currents for the protective device, with each estimated minimum fault current in the plurality of estimated minimum fault currents corresponding to a phase of the power distribution system; and determining the adaptive pickup setting for the protective device comprises determining a plurality of adaptive pickup settings for the protective device, with each adaptive pickup setting in the plurality of adaptive pickup settings corresponding to the respective phase of the power distribution system.

Example 6: The device of any of examples 1-5, wherein the at least one processor is further configured to: iteratively determine the estimated minimum fault current for the protective device; and iteratively determine the adaptive pickup setting for the protective device.

Example 7: The device of any of examples 1-6, wherein the device comprises the protective device.

Example 8: A method comprising: determining, by a computing device comprising at least one processor, based on one or more steady state system parameters that define a state of a power distribution system, a value of a voltage at a protective device in the power distribution system, and a value of a current at the protective device, an estimated minimum fault current for the protective device; determining, by the computing device, based on the estimated minimum fault current and a rated load current for the protective device, an adaptive pickup setting for the protective device; and responsive to determining that an updated value of the current at the protective device exceeds the adaptive pickup setting, causing, by the computing device, the protective device to trip a circuit breaker.

Example 9: The method of example 8, wherein the one or more steady state system parameters comprise at least one of: a line impedance in a protection zone covered by the protective device; a rated current capacity of downstream aggregated equivalent generation within the protection zone; a rated current capacity of downstream aggregated equivalent generation outside of the protection zone; an aggregation factor representing a ratio of an equivalent impedance of the downstream aggregated equivalent generation within the protection zone to the line impedance in the protection zone; a minimum terminal voltage of downstream aggregated equivalent generation within the protection zone; a minimum terminal voltage of downstream aggregated equivalent generation outside of the protection zone; a base voltage for the protective device; or a rated load current for the protective device.

Example 10: The method of example 9, wherein determining the estimated minimum fault current for the protective device comprises calculating $$I_{Fault-PD}=\left(\frac{V_{PD-PV}}{Z_L^*+R_{f\_estimate}}\right)-I_{2-rated}\left(*\frac{(1-r)Z_L^*+R_{f\_estimate}}{Z_L^*+R_{f\_estimate}}\right)-I_{3-rated}\left(\frac{R_{f\_estimate}}{Z_L^*+R_{f\_estimate}}\right)+I_{load-fictitious},$$

wherein:

$I_{Fault\text{-}PD}$ represents the estimated minimum fault current; $V_{PD\text{-}PV}$ represents the value of the voltage at the protective device;

$$Z_L^*$$

represents an adjusted zonal impedance determined based on the line impedance in the protection zone; $R_{f\_estimate}$ represents a fault impedance compensation factor determined based on the value of the voltage at the protective device, the value of the current at the protective device, and the adjusted zonal impedance; $I_{2\text{-}rated}$ represents the rated current capacity of downstream aggregated equivalent generation within the protection zone; r represents the aggregation factor; $I_{3\text{-}rated}$ represents the rated current capacity of downstream aggregated equivalent generation outside of the protection zone; and $I_{load\text{-}fictitious}$ represents a downstream load compensation factor determined based on the value of the voltage at the protective device, the base voltage for the protective device, and the rated load current for the protective device.

Example 11: The method of any of examples 8-10, wherein determining the adaptive pickup setting for the protective device comprises calculating $I_{pickup\text{-}dynamic}=a*I_{Fault\text{-}PD}+b*I_{load\text{-}max\text{-}PD}$, subject to: a, b∈[−2,2]; and $I_{FAULT\text{-}PD}>I_{pickup\text{-}dynamic}>I_{load\text{-}max\text{-}PD}$, wherein: $I_{pickup\text{-}dynamic}$ represents the adaptive pickup setting for the protective device; $I_{Fault\text{-}PD}$ represents the estimated minimum fault current; a represents a first scaling factor usable to adjust an importance of the estimated minimum fault current; $I_{load\text{-}max\text{-}PD}$ represents a rated load current for the protective device; and b represents a second scaling factor usable to adjust an importance of the rated load current for the protective device.

Example 12: The method of any of examples 8-11, wherein: determining the estimated minimum fault current for the protective device comprises determining a plurality of estimated minimum fault currents for the protective device, with each estimated minimum fault current in the plurality of estimated minimum fault currents corresponding to a phase of the power distribution system; and determining the adaptive pickup setting for the protective device comprises determining a plurality of adaptive pickup settings for the protective device, with each adaptive pickup setting in the plurality of adaptive pickup settings corresponding to the respective phase of the power distribution system.

Example 13: The method of any of examples 8-12, further comprising: iteratively determining the estimated minimum fault current for the protective device; and iteratively determining the adaptive pickup setting for the protective device.

Example 14: The method of any of examples 8-12, wherein the computing device comprises the protective device.

Example 15: A computer readable storage medium encoded with instructions that, when executed, cause at least one processor of a computing device to: determine, based on one or more steady state system parameters that define a state of a power distribution system, a value of a voltage at a protective device in the power distribution system, and a value of a current at the protective device, an estimated minimum fault current for the protective device; determine, based on the estimated minimum fault current and a rated load current for the protective device, an adaptive pickup setting for the protective device; and responsive to determining that an updated value of the current at the protective device exceeds the adaptive pickup setting, cause the protective device to trip a circuit breaker.

Example 16: The computer readable storage medium of example 15, wherein the one or more steady state system parameters comprise at least one of: a line impedance in a protection zone covered by the protective device; a rated current capacity of downstream aggregated equivalent generation within the protection zone; a rated current capacity of downstream aggregated equivalent generation outside of the protection zone; an aggregation factor representing a ratio of an equivalent impedance of the downstream aggregated equivalent generation within the protection zone to the line impedance in the protection zone; a minimum terminal voltage of downstream aggregated equivalent generation within the protection zone; a minimum terminal voltage of downstream aggregated equivalent generation outside of the protection zone; a base voltage for the protective device; or a rated load current for the protective device.

Example 17: The computer readable storage medium of example 16, wherein determining the estimated minimum fault current for the protective device comprises calculating $$I_{Fault-PD} = \left(\frac{V_{PD-PV}}{Z_L^* + R_{f\_estimate}}\right) - I_{2-rated}\left(\frac{(1-r)Z_L^* + R_{f\_estimate}}{Z_L^* + R_{f\_estimate}}\right) - I_{3-rated}\left(\frac{R_{f\_estimate}}{Z_L^* + R_{f\_estimate}}\right) + I_{load-fictitious},$$

wherein: $I_{Fault-PD}$ represents the estimated minimum fault current; $V_{PD-PV}$ represents the value of the voltage at the protective device;

$$Z_L^*$$

represents an adjusted zonal impedance determined based on the line impedance in the protection zone; $R_{f\_estimate}$ represents a fault impedance compensation factor determined based on the value of the voltage at the protective device, the value of the current at the protective device, and the adjusted zonal impedance; $I_{2-rated}$ represents the rated current capacity of downstream aggregated equivalent generation within the protection zone; r represents the aggregation factor; $I_{3-rated}$ represents the rated current capacity of downstream aggregated equivalent generation outside of the protection zone; and $I_{load-fictitious}$ represents a downstream load compensation factor determined based on the value of the voltage at the protective device, the base voltage for the protective device, and the rated load current for the protective device.

Example 18: The computer readable storage medium of any of examples 15-17, wherein determining the adaptive pickup setting for the protective device comprises calculating $I_{pickup-dynamic}=a*I_{Fault-PD}+b*I_{load-max-PD}$, subject to: a, b∈[−2,2]; and $I_{FAULT-PD}>I_{pickup-dynamic}>I_{load-max-PD}$, wherein: $I_{pickup-dynamic}$ represents the adaptive pickup setting for the protective device; $I_{Fault-PD}$ represents the estimated minimum fault current; a represents a first scaling factor usable to adjust an importance of the estimated minimum fault current; $I_{load-max-PD}$ represents a rated load current for the protective device; and b represents a second scaling factor usable to adjust an importance of the rated load current for the protective device.

Example 19: The computer readable storage medium of any of examples 15-18, wherein: determining the estimated minimum fault current for the protective device comprises determining a plurality of estimated minimum fault currents for the protective device, with each estimated minimum fault current in the plurality of estimated minimum fault currents corresponding to a phase of the power distribution system; and determining the adaptive pickup setting for the protective device comprises determining a plurality of adaptive pickup settings for the protective device, with each adaptive pickup setting in the plurality of adaptive pickup settings corresponding to the respective phase of the power distribution system.

Example 20: The computer readable storage medium of any of claims 15-19, further comprising instructions that, when executed, cause the at least one processor to: iteratively determine the estimated minimum fault current for the protective device; and iteratively determine the adaptive pickup setting for the protective device.

In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A device comprising:

at least one processor configured to:

determine, based on one or more steady state system parameters that define a state of a power distribution system, a value of a voltage at a protective device in the power distribution system, and a value of a current at the protective device, an estimated minimum fault current for the protective device;

determine, based on the estimated minimum fault current and a rated load current for the protective device, an adaptive pickup setting for the protective device; and responsive to determining that an updated value of the current at the protective device exceeds the adaptive pickup setting, cause the protective device to trip a circuit breaker.

2. The device of claim 1, wherein the one or more steady state system parameters comprise at least one of:

a line impedance in a protection zone covered by the protective device;

a rated current capacity of downstream aggregated equivalent generation within the protection zone;

a rated current capacity of downstream aggregated equivalent generation outside of the protection zone;

an aggregation factor representing a ratio of an equivalent impedance of the downstream aggregated equivalent generation within the protection zone to the line impedance in the protection zone;

a minimum terminal voltage of downstream aggregated equivalent generation within the protection zone;

a minimum terminal voltage of downstream aggregated equivalent generation outside of the protection zone;

a base voltage for the protective device; or a rated load current for the protective device.

3. The device of claim 2, wherein determining the estimated minimum fault current for the protective device comprises calculating $$I_{Fault-PD} = \left(\frac{V_{PD-PV}}{Z_L^* + R_{f\_estimate}}\right) - I_{2-rated}\left(\frac{(1-r)Z_L^* + R_{f\_estimate}}{Z_L^* + R_{f\_estimate}}\right) - I_{3-rated}\left(\frac{R_{f\_estimate}}{Z_L^* + R_{f\_estimate}}\right) + I_{load-fictitious},$$

wherein:

$I_{Fault-PD}$ represents the estimated minimum fault current;

$V_{PD-PV}$ represents the value of the voltage at the protective device;

$$Z_L^*$$

represents an adjusted zonal impedance determined based on the line impedance in the protection zone;

$R_{f\_estimate}$ represents a fault impedance compensation factor determined based on the value of the voltage at the protective device, the value of the current at the protective device, and the adjusted zonal impedance;

$I_{2-rated}$ represents the rated current capacity of downstream aggregated equivalent generation within the protection zone;

r represents the aggregation factor;

$I_{3-rated}$ represents the rated current capacity of downstream aggregated equivalent generation outside of the protection zone; and $I_{load-fictitious}$ represents a downstream load compensation factor determined based on the value of the voltage at the protective device, the base voltage for the protective device, and the rated load current for the protective device.

4. The device of claim 1, wherein determining the adaptive pickup setting for the protective device comprises calculating $I_{pickup-dynamic}=a*I_{Fault-PD}+b*I_{load-max-PD}$, subject to: a, b∈[−2,2]; and $I_{FAULT-PD}>I_{pickup-dynamic}>I_{load-max-PD}$, wherein:

$I_{pickup-dynamic}$ represents the adaptive pickup setting for the protective device;

$I_{Fault-PD}$ represents the estimated minimum fault current;

a represents a first scaling factor usable to adjust an importance of the estimated minimum fault current;

$I_{load\text{-}max\text{-}PD}$ represents a rated load current for the protective device; and b represents a second scaling factor usable to adjust an importance of the rated load current for the protective device.

5. The device of claim 1, wherein:

determining the estimated minimum fault current for the protective device comprises determining a plurality of estimated minimum fault currents for the protective device, with each estimated minimum fault current in the plurality of estimated minimum fault currents corresponding to a phase of the power distribution system; and determining the adaptive pickup setting for the protective device comprises determining a plurality of adaptive pickup settings for the protective device, with each adaptive pickup setting in the plurality of adaptive pickup settings corresponding to the respective phase of the power distribution system.

6. The device of claim 1, wherein the at least one processor is further configured to:

iteratively determine the estimated minimum fault current for the protective device; and iteratively determine the adaptive pickup setting for the protective device.

7. The device of claim 1, wherein the device comprises the protective device.

8. A method comprising:

determining, by a computing device comprising at least one processor, based on one or more steady state system parameters that define a state of a power distribution system, a value of a voltage at a protective device in the power distribution system, and a value of a current at the protective device, an estimated minimum fault current for the protective device;

determining, by the computing device, based on the estimated minimum fault current and a rated load current for the protective device, an adaptive pickup setting for the protective device; and responsive to determining that an updated value of the current at the protective device exceeds the adaptive pickup setting, causing, by the computing device, the protective device to trip a circuit breaker.

9. The method of claim 8, wherein the one or more steady state system parameters comprise at least one of:

a line impedance in a protection zone covered by the protective device;

a rated current capacity of downstream aggregated equivalent generation within the protection zone;

a rated current capacity of downstream aggregated equivalent generation outside of the protection zone;

an aggregation factor representing a ratio of an equivalent impedance of the downstream aggregated equivalent generation within the protection zone to the line impedance in the protection zone;

a minimum terminal voltage of downstream aggregated equivalent generation within the protection zone;

a minimum terminal voltage of downstream aggregated equivalent generation outside of the protection zone;

a base voltage for the protective device; or a rated load current for the protective device.

10. The method of claim 9, wherein determining the estimated minimum fault current for the protective device comprises calculating $$I_{Fault-PD} = \left(\frac{V_{PD-PV}}{Z_L^* + R_{f\_estimate}}\right) - I_{2-rated}\left(\frac{(1-r)Z_L^* + R_{f\_estimate}}{Z_L^* + R_{f\_estimate}}\right) - I_{3-rated}\left(\frac{R_{f\_estimate}}{Z_L^* + R_{f\_estimate}}\right) + I_{load-fictitious},$$

wherein:

$I_{Fault\text{-}PD}$ represents the estimated minimum fault current;

$V_{PD\text{-}PV}$ represents the value of the voltage at the protective device;

$$Z_L^*$$

represents an adjusted zonal impedance determined based on the line impedance in the protection zone;

$R_{f\_estimate}$ represents a fault impedance compensation factor determined based on the value of the voltage at the protective device, the value of the current at the protective device, and the adjusted zonal impedance;

$I_{2\text{-}rated}$ represents the rated current capacity of downstream aggregated equivalent generation within the protection zone;

r represents the aggregation factor;

$I_{3\text{-}rated}$ represents the rated current capacity of downstream aggregated equivalent generation outside of the protection zone; and $I_{load\text{-}fictitious}$ represents a downstream load compensation factor determined based on the value of the voltage at the protective device, the base voltage for the protective device, and the rated load current for the protective device.

11. The method of claim 8, wherein determining the adaptive pickup setting for the protective device comprises calculating $I_{pickup\text{-}dynamic}=a*I_{Fault\text{-}PD}+b*I_{load\text{-}max\text{-}PD}$, subject to: a, b∈[−2,2]; and $I_{FAULT\text{-}PD}>I_{pickup\text{-}dynamic}>I_{load\text{-}max\text{-}PD}$, wherein:

$I_{pickup\text{-}dynamic}$ represents the adaptive pickup setting for the protective device;

$I_{Fault\text{-}PD}$ represents the estimated minimum fault current;

a represents a first scaling factor usable to adjust an importance of the estimated minimum fault current;

$I_{load\text{-}max\text{-}PD}$ represents a rated load current for the protective device; and b represents a second scaling factor usable to adjust an importance of the rated load current for the protective device.

12. The method of claim 8, wherein:

determining the estimated minimum fault current for the protective device comprises determining a plurality of estimated minimum fault currents for the protective device, with each estimated minimum fault current in the plurality of estimated minimum fault currents corresponding to a phase of the power distribution system; and determining the adaptive pickup setting for the protective device comprises determining a plurality of adaptive pickup settings for the protective device, with each adaptive pickup setting in the plurality of adaptive pickup settings corresponding to the respective phase of the power distribution system.

13. The method of claim 8, further comprising:

iteratively determining the estimated minimum fault current for the protective device; and iteratively determining the adaptive pickup setting for the protective device.

14. The method of claim 8, wherein the computing device comprises the protective device.

15. A computer readable storage medium encoded with instructions that, when executed, cause at least one processor of a computing device to:

determine, based on one or more steady state system parameters that define a state of a power distribution system, a value of a voltage at a protective device in the power distribution system, and a value of a current at the protective device, an estimated minimum fault current for the protective device;

determine, based on the estimated minimum fault current and a rated load current for the protective device, an adaptive pickup setting for the protective device; and responsive to determining that an updated value of the current at the protective device exceeds the adaptive pickup setting, cause the protective device to trip a circuit breaker.

16. The computer readable storage medium of claim 15, wherein the one or more steady state system parameters comprise at least one of:

a line impedance in a protection zone covered by the protective device;

a rated current capacity of downstream aggregated equivalent generation within the protection zone;

a rated current capacity of downstream aggregated equivalent generation outside of the protection zone;

an aggregation factor representing a ratio of an equivalent impedance of the downstream aggregated equivalent generation within the protection zone to the line impedance in the protection zone;

a minimum terminal voltage of downstream aggregated equivalent generation within the protection zone;

a minimum terminal voltage of downstream aggregated equivalent generation outside of the protection zone;

a base voltage for the protective device; or a rated load current for the protective device.

17. The computer readable storage medium of claim 16, wherein determining the estimated minimum fault current for the protective device comprises calculating $$I_{Fault\text{-}PD} = \left(\frac{V_{PD-PV}}{Z_L^* + R_{f\_estimate}}\right) - I_{2-rated}\left(\frac{(1-r)Z_L^* + R_{f\_estimate}}{Z_L^* + R_{f\_estimate}}\right) - I_{3-rated}\left(\frac{R_{f\_estimate}}{Z_L^* + R_{f\_estimate}}\right) + I_{load-fictitious},$$

wherein:

$I_{Fault\text{-}PD}$ represents the estimated minimum fault current;

$V_{PD\text{-}PV}$ represents the value of the voltage at the protective device;

$$Z_L^*$$

represents an adjusted zonal impedance determined based on the line impedance in the protection zone;

$R_{f\_estimate}$ represents a fault impedance compensation factor determined based on the value of the voltage at the protective device, the value of the current at the protective device, and the adjusted zonal impedance;

$I_{2\text{-}rated}$ represents the rated current capacity of downstream aggregated equivalent generation within the protection zone;

r represents the aggregation factor;

$I_{3\text{-}rated}$ represents the rated current capacity of downstream aggregated equivalent generation outside of the protection zone; and $I_{load\text{-}fictitious}$ represents a downstream load compensation factor determined based on the value of the voltage at the protective device, the base voltage for the protective device, and the rated load current for the protective device.

18. The computer readable storage medium of claim 15, wherein determining the adaptive pickup setting for the protective device comprises calculating $I_{pickup\text{-}dynamic}=a^*I_{Fault\text{-}PD}+b^*I_{load\text{-}max\text{-}PD}$, subject to: a, b∈[−2,2]; and $I_{FAULT\text{-}PD}>I_{pickup\text{-}dynamic}>I_{load\text{-}max\text{-}PD}$, wherein:

$I_{pickup\text{-}dynamic}$ represents the adaptive pickup setting for the protective device;

$I_{Fault\text{-}PD}$ represents the estimated minimum fault current;

a represents a first scaling factor usable to adjust an importance of the estimated minimum fault current;

$I_{load\text{-}max\text{-}PD}$ represents a rated load current for the protective device; and b represents a second scaling factor usable to adjust an importance of the rated load current for the protective device.

19. The computer readable storage medium of claim 15, wherein:

determining the estimated minimum fault current for the protective device comprises determining a plurality of estimated minimum fault currents for the protective device, with each estimated minimum fault current in the plurality of estimated minimum fault currents corresponding to a phase of the power distribution system; and determining the adaptive pickup setting for the protective device comprises determining a plurality of adaptive pickup settings for the protective device, with each adaptive pickup setting in the plurality of adaptive pickup settings corresponding to the respective phase of the power distribution system.

20. The computer readable storage medium of claim 15, further comprising instructions that, when executed, cause the at least one processor to:

iteratively determine the estimated minimum fault current for the protective device; and iteratively determine the adaptive pickup setting for the protective device.

* * * * *